(12) United States Patent
Vasseur et al.

(10) Patent No.: US 9,473,364 B2
(45) Date of Patent: Oct. 18, 2016

(54) LEARNING MACHINE-BASED GRANULAR SEGMENT/PATH CHARACTERISTIC PROBING TECHNIQUE

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US); Grégory Mermoud, Veyras (CH); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 262 days.

(21) Appl. No.: 14/164,544

(22) Filed: Jan. 27, 2014

(65) Prior Publication Data

US 2015/0195184 A1    Jul. 9, 2015

Related U.S. Application Data

(60) Provisional application No. 61/923,910, filed on Jan. 6, 2014.

(51) Int. Cl.
| | | |
|---|---|---|
| *H04L 12/24* | (2006.01) | |
| *H04L 12/805* | (2013.01) | |
| *H04W 24/02* | (2009.01) | |
| *H04L 12/751* | (2013.01) | |
| *H04L 12/803* | (2013.01) | |
| *H04L 12/26* | (2006.01) | |
| *H04W 24/04* | (2009.01) | |
| *H04L 12/721* | (2013.01) | |

(52) U.S. Cl.
CPC ......... *H04L 41/5025* (2013.01); *H04L 45/02* (2013.01); *H04L 47/122* (2013.01); *H04L 47/365* (2013.01); *H04W 24/02* (2013.01); *H04L 43/0852* (2013.01); *H04L 45/70* (2013.01); *H04W 24/04* (2013.01)

(58) Field of Classification Search
None
See application file for complete search history.

(56) References Cited

U.S. PATENT DOCUMENTS

| | | |
|---|---|---|
| 6,577,597 B1 | 6/2003 | Natarajan et al. |
| 6,694,471 B1 | 2/2004 | Sharp |
| 6,769,024 B1 | 7/2004 | Natarajan et al. |

(Continued)

OTHER PUBLICATIONS

Fan, N., "Learning Nonlinear Distance Functions Using Neural Network for Regression with Application to Robust Human Age Estimation", IEEE International Conference on Computer Vision (ICCV), Nov. 2011, pp. 249-254, Institute of Electrical and Electronics Engineers, Barcelona, Spain.

(Continued)

*Primary Examiner* — Alan Chen
(74) *Attorney, Agent, or Firm* — Paker Ibrahim & Berg LLC; James M. Behmke; Stephen D. LeBarron (57) ABSTRACT

In one embodiment, a routing topology of a network including nodes interconnected by communication links is determined. Important nodes in the network which are of relative importance are determined based on their location in the determined routing topology. Also, one or more request messages are sent causing the important nodes to gather local network metrics. Then, in response to the one or more request messages, one or more response messages including the network metrics gathered by each important node are received.

23 Claims, 9 Drawing Sheets

(56) References Cited

U.S. PATENT DOCUMENTS

| | | |
|---|---|---|
| 6,785,239 B1 | 8/2004 | Tasker |
| 6,886,040 B1 | 4/2005 | Fitzgerald |
| 6,961,573 B1 | 11/2005 | Moon et al. |
| 6,973,034 B1 | 12/2005 | Natarajan et al. |
| 7,092,410 B2 | 8/2006 | Bordonaro et al. |
| 7,457,877 B1 | 11/2008 | Shah et al. |
| 7,568,045 B1 | 7/2009 | Agrawal |
| 7,606,895 B1 | 10/2009 | Dini et al. |
| 7,613,128 B2 | 11/2009 | Castagnoli et al. |
| 7,680,047 B2 | 3/2010 | Vadlakonda et al. |
| 7,724,676 B2 | 5/2010 | Gerstel et al. |
| 7,826,372 B1* | 11/2010 | Mabe .......... H04L 45/122 370/237 |
| 7,948,910 B2 | 5/2011 | Arbel et al. |
| 8,005,000 B1 | 8/2011 | Srinivasan |
| 8,369,213 B2 | 2/2013 | Vasseur et al. |
| 8,605,591 B2 | 12/2013 | Shaffer et al. |
| 8,630,177 B2 | 1/2014 | Vasseur et al. |
| 8,630,291 B2 | 1/2014 | Shaffer et al. |
| 8,634,314 B2 | 1/2014 | Banka et al. |
| 8,638,778 B2 | 1/2014 | Lee et al. |
| 2002/0159386 A1* | 10/2002 | Grosdidier .......... H04L 12/2602 370/229 |
| 2009/0003232 A1* | 1/2009 | Vaswani ................. H04L 45/00 370/252 |
| 2009/0019147 A1 | 1/2009 | Ahlers et al. |
| 2011/0085461 A1 | 4/2011 | Liu et al. |
| 2012/0155475 A1 | 6/2012 | Vasseur et al. |
| 2012/0163177 A1* | 6/2012 | Vaswani ................. H04L 45/00 370/236 |
| 2012/0233308 A1 | 9/2012 | Van De Houten et al. |
| 2012/0307653 A1 | 12/2012 | Vasseur et al. |
| 2013/0022053 A1 | 1/2013 | Vasseur et al. |
| 2013/0022083 A1 | 1/2013 | Vasseur et al. |
| 2013/0024560 A1 | 1/2013 | Vasseur et al. |
| 2013/0028103 A1 | 1/2013 | Hui et al. |
| 2013/0121331 A1 | 5/2013 | Vasseur et al. |
| 2013/0159479 A1 | 6/2013 | Vasseur |
| 2013/0159486 A1 | 6/2013 | Vasseur |
| 2013/0159550 A1 | 6/2013 | Vasseur |
| 2013/0201858 A1 | 8/2013 | Varma et al. |
| 2013/0223229 A1 | 8/2013 | Hui et al. |
| 2013/0250811 A1 | 9/2013 | Vasseur et al. |
| 2013/0336126 A1 | 12/2013 | Vasseur et al. |
| 2013/0336316 A1 | 12/2013 | Sudhaakar et al. |
| 2014/0003277 A1 | 1/2014 | Shim |
| 2014/0022928 A1 | 1/2014 | Zingale et al. |
| 2014/0092753 A1 | 4/2014 | Vasseur et al. |
| 2014/0126423 A1* | 5/2014 | Vasseur ................. H04L 45/48 370/255 |
| 2014/0219103 A1* | 8/2014 | Vasseur ................. H04L 45/125 370/237 |

OTHER PUBLICATIONS

Fortunato, S., "Community Detection in Graphs", arXiv:0906.0612v2.pdf [physics.soc-ph]; Physics Reports 486, 75-174, Jan. 2010, 103 pages.

Hui, et al., "An IPv6 Routing Header for Source Routes with the Routing Protocol for Low-Power and Lossy Networks (RPL)", Request for Comments 6554, Mar. 2012, 13 pages, Internet Engineering Task Force Trust.

Newman, et al., "Modularity and Community Structure in Networks", Proceedings of the National Academy of Sciences of the United States of America, Jun. 2006, vol. 103, No. 23, pp. 8577-8582, PNAS, Washington, DC.

Newman, M. E. J., "Analysis of Weighted Networks", http://arxiv.org/pdf/condmat/0407503.pdf, Phys. Rev. E 70, 056131, Jul. 2004, 9 pages.

Siddiky, et al., "An Efficient Approach to Rotation Invariant Face Detection Using PCA, Generalized Regression Neural Network and Mahalanobis Distance by Reducing Search Space", 10th International Conference on Computer and Information Technology, Dec. 2007, 6 pages, Dhaka, Bangladesh.

Ting, et al., "Variational Bayesian Least Squares: An Application to Brain-Machine Interface Data", Neural Networks, vol. 21, Issue 8, Oct. 2008, pp. 1112-1131, Elsevier.

Vasseur, et al., "Routing Metrics Used for Path Calculation in Low-Power and Lossy Networks", Request for Comments 6551, Mar. 2012, 30 pages, Internet Engineering Task Force Trust.

Vasseur, et al., "Learning-Machine-Based Predictive and Proactive Computer Networking and Associated Monitoring", U.S. Appl. No. 61/923,910, filed Jan. 6, 2014, 105 pages, U.S. Patent and Trademark Office, Alexandria, VA.

Winter, et al., "RPL: IPv6 Routing Protocol for Low-Power and Lossy Networks", Request for Comments 6550, Mar. 2012, 157 pages, Internet Engineering Task Force Trust.

\* cited by examiner

A BAYESIAN NETWORK REPRESENTING THE JOINT PROBABILITY DISTRIBUTION OVER THREE RANDOM VARIABLES: X, Y, AND Z

FIG. 4

FIG. 5
BN FOR LINEAR REGRESSION

LEARNING MACHINE-BASED GRANULAR SEGMENT/PATH CHARACTERISTIC PROBING TECHNIQUE

RELATED APPLICATION

This application claims priority to U.S. Provisional Application No. 61/923,910, filed Jan. 6, 2014, entitled: LEARNING-MACHINE-BASED PREDICTIVE AND PROACTIVE COMPUTER NETWORKING AND ASSOCIATED MONITORING, by Vasseur, et al., the contents of which are herein incorporated by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and performance indicators), and recognize complex patterns in these data. In general, these patterns are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning Machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a routing topology of a network including nodes interconnected by communication links is determined. Important nodes in the network which are of relative importance are determined based on their location in the determined routing topology. Also, one or more request messages are sent causing the important nodes to gather local network metrics. Then, in response to the one or more request messages, one or more response messages including the network metrics gathered by each important node are received.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
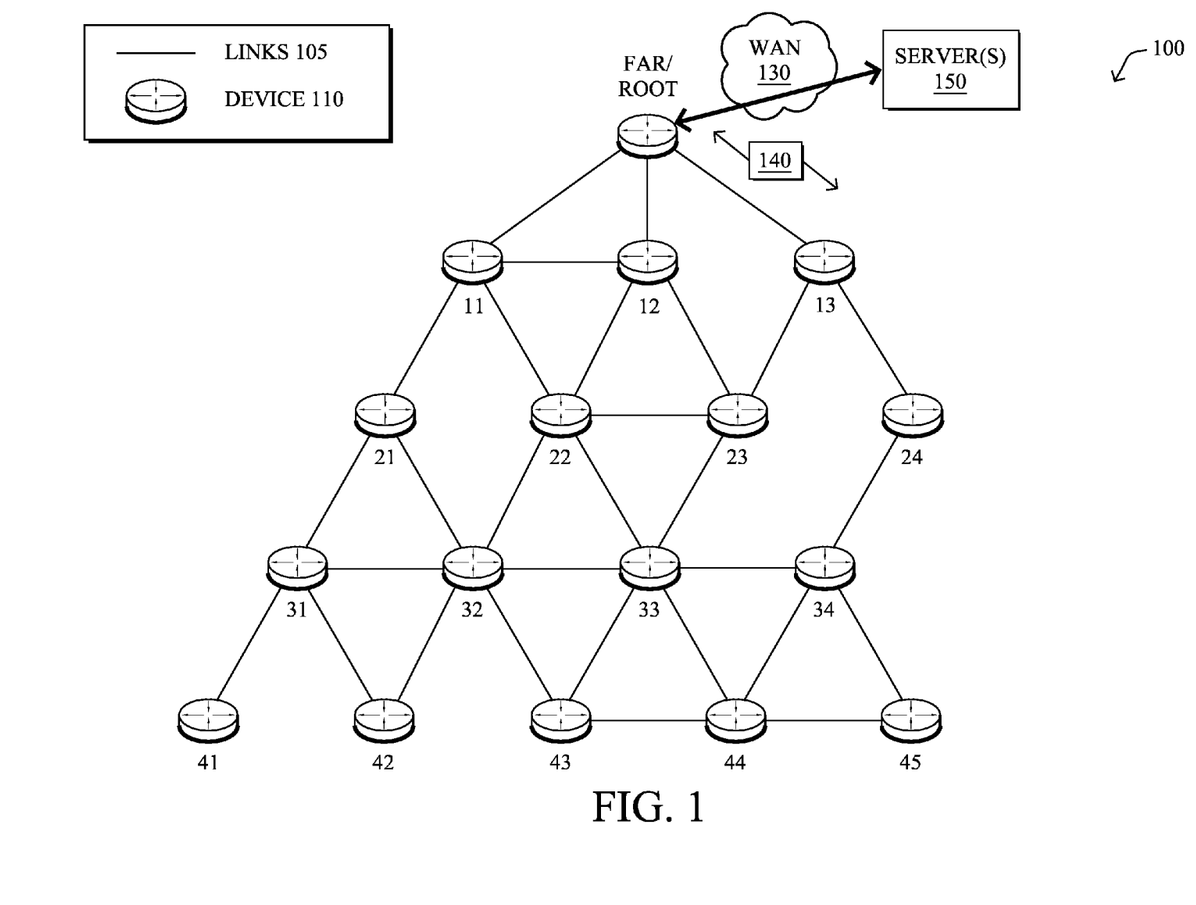
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
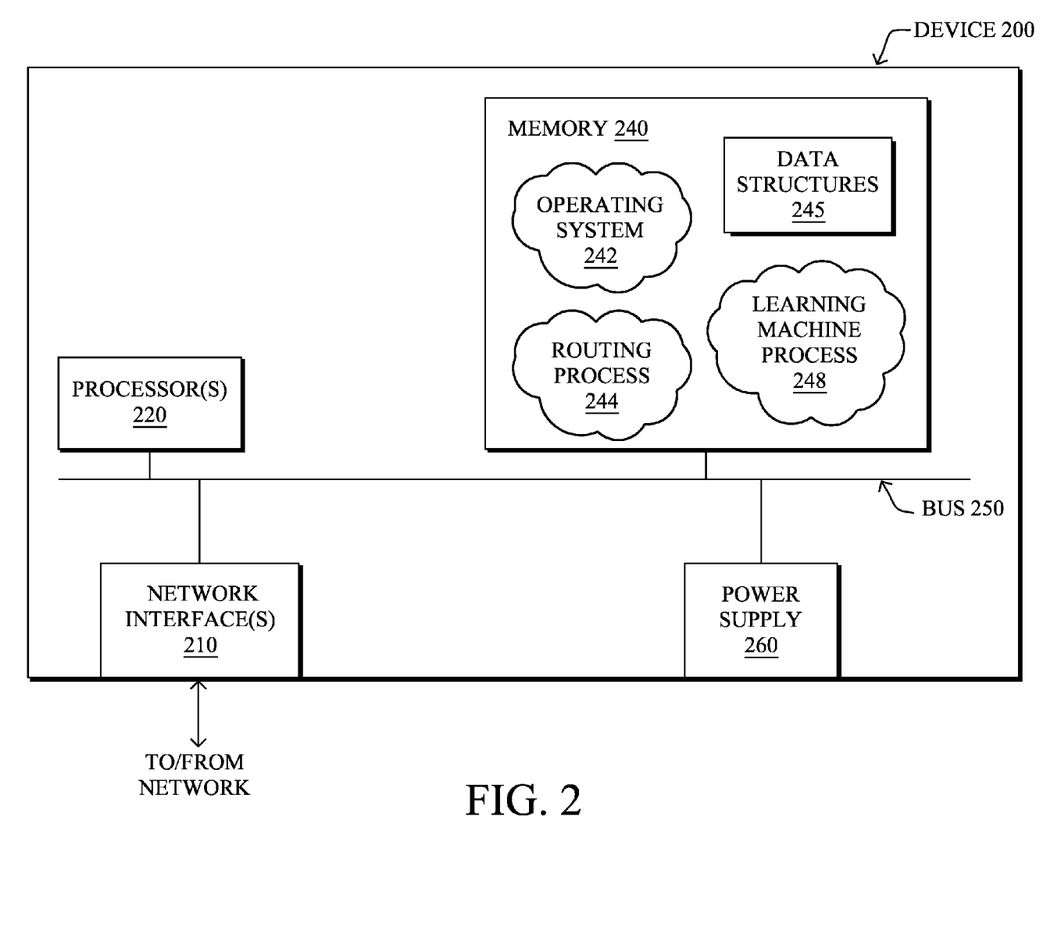
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
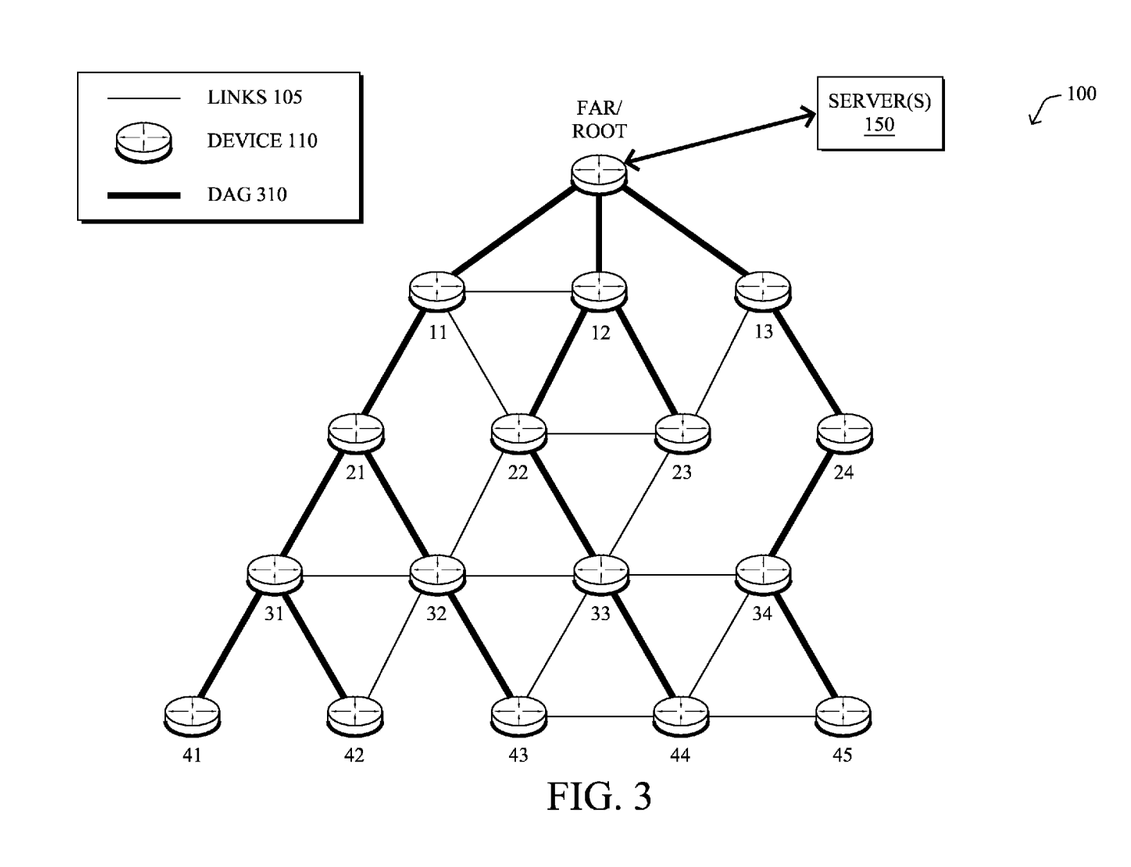
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

RPL supports two modes of operation for maintaining and using Downward routes:

1) Storing Mode: RPL routers unicast DAO messages directly to their DAG Parents. In turn, RPL routers maintain reachable IPv6 addresses for each of their DAG Children in their routing table. Because intermediate RPL routers store Downward routing state, this mode is called Storing mode.

2) Non-Storing Mode: RPL routers unicast DAO messages directly to the DAG Root. The DAO message also includes the IPv6 addresses for the source's DAG Parents. By receiving DAO messages from each RPL router in the network, the DAG Root obtains information about the DAG topology and can use source routing to deliver datagrams. Unlike Storing mode, intermediate RPL routers in Non-Storing mode do not maintain any Downward routes.

Learning Machine Technique(s)

As noted above, machine learning (ML) is concerned with the design and the development of algorithms that take as input empirical data (such as network statistics and performance indicators), and recognize complex patterns in these data. One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Figure 4:
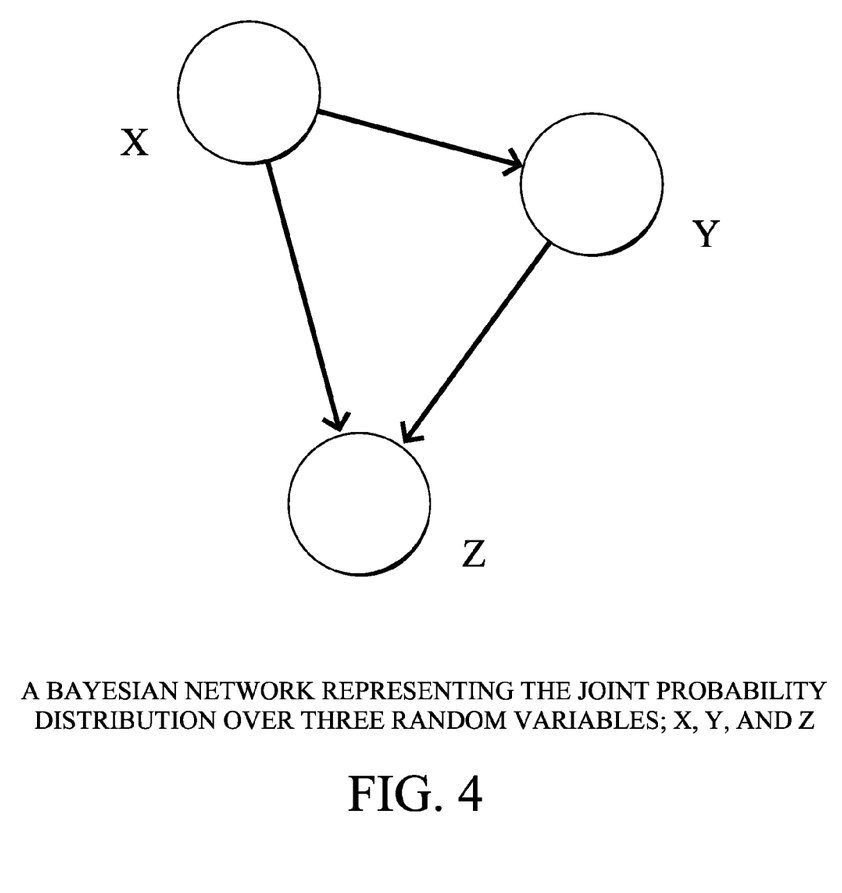
FIG. 4 illustrates an example Bayesian network.

In particular, many LMs can be expressed in the form of a probabilistic graphical model also called Bayesian Network (BN). A BN is a graph G=(V,E) where V is the set of vertices and E is the set of edges. The vertices are random variables, e.g., X, Y, and Z (see FIG. 4) whose joint distribution P(X,Y,Z) is given by a product of conditional probabilities:

$$P(X,Y,Z)=P(Z|X,Y)P(Y|X)P(X) \quad \text{(Eq. 1)}$$

The conditional probabilities in Eq. 1 are given by the edges of the graph in FIG. 4. In the context of LMs, BNs are used to construct the model M as well as its parameters.

To estimate the relationship between network properties of a node I (or link), noted $x_i$, (e.g., hop count, rank, firmware version, etc.) and a given networking metric $M_i$, a linear regression may be performed. More specifically, given the following equation:

$$M_i=F(x_i)=b^T x_i+\epsilon \quad \text{(Eq. 2)}$$

where $x_i$ is a d-dimensional vector of observed data (e.g., end-node properties such as the rank, the hop count, the distance to the FAR, etc.) and $M_i$ is the target metric (e.g., the time to join the network), which is also noted $y_i$ sometimes. Building such a model of a performance metric knowing a set of observed features is critical to perform root cause analysis, network monitoring, and configuration: for example the path delay as a function of the node rank, link quality, etc., can then be used to determine whether anomalies appear in the network and thus take some appropriate actions to fix the issue. In the equation (Eq. 2) above, the term $\epsilon$ is a Gaussian random variable used to model the uncertainty and/or the noise on the estimate $M_i$. The linear regression consists in finding the weight vector b that fulfills the maximum likelihood criterion (which coincides with the least square criterion when $\epsilon$ is Gaussian). In particular, the optimal b must minimize the Mean Squared Error (MSE):

$$MSE=\Sigma_i(b^T x_i-y_i)^2/N \quad \text{(Eq. 3)}$$

where N is the total number of input data points, i.e., i=1, . . . , N.

In other words, b is a set of weights for each observed value $x_i$, used to compute the function F that provides the value of F. The MSE is a metric used to compute the "quality" of the model function F.

The usual approach to the solving of Eq. (2) is the ordinary least square (OLS) equation, which involves a "d×d" matrix inversion, where d is the number of dimensions. Three main problems arise immediately: (i) the dimensionality of $x_i$ may be large, thus making OLS prohibitively expensive in terms of computational cost (approximately $O(d^3)$), (ii) in presence of co-linearity (i.e., when several node properties are strongly correlated, as it is the case for the hop count and the ETX, for instance), OLS becomes numerically unstable (i.e., round-off and truncation errors are magnified, causing the MSE to grow exponentially), (iii) OLS being essentially non-probabilistic (i.e., it doesn't account for the whole distribution of its constituent variables, but it merely tracks averages), it cannot cope well with noise and outliers, and it is simply not applicable when $\epsilon$ is not Gaussian.

Figure 5:
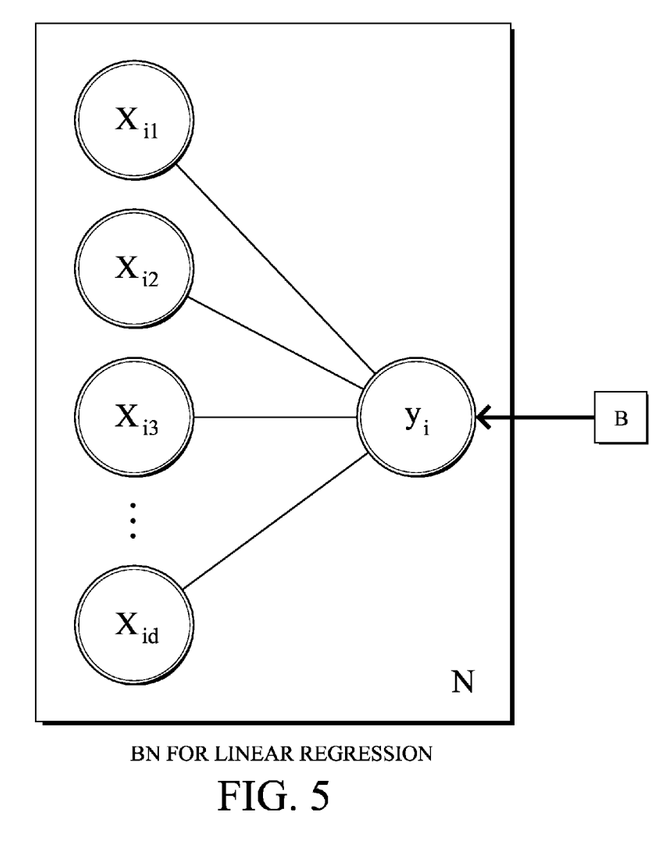
FIG. 5 illustrates an example Bayesian network for linear regression.

To overcome these limitations, the problem can be formulated as a BN (see FIG. 5). Now, all variables are considered as random variables, even though they are all observed at this point: both input variable $x_i$ and the output variable $y_i$, are experimental data, and b is a (non-probabilistic) parameter of the BN at this point. By pushing this approach a little bit further, one may turn b into a random variable as well, and attempt to infer it from experimental data (that is, the observations of $x_i$ and $y_i$). However, this inference problem is non-trivial, especially as one desirable feature of this learning algorithm is that it is capable of identifying non-relevant dimensionalities of x (that is, input dimensions that are weakly correlated with the output x), and automatically set the corresponding weights in b to a zero (or a very small) value.

This problem is solved by one recently proposed algorithm called Variational Bayes Least Square (VBLS) regression (Ting, D'Souza, Vijayakumar, & Schaal, 2010). Namely, this algorithm allows for efficient learning and feature selection in high-dimensional regression problems, while avoiding the use of expensive and numerically brittle matrix inversion. VBLS adds a series of non-observed random variables $z_{ij}$ that can be considered as noisy, fake targets of the factor $b_j \cdot x_{ij}$, and whose sum $\Sigma_j z_{ij}$ is an estimate of $y_i$. In turn, the weights $b_j$ are modeled as random variables, thereby allowing for automated feature detection, i.e., the mean of $b_j$ converges rapidly to zero if no correlation exists between the various $x_{ij}$ and $y_i$.

VBLS estimates the distribution of the non-observed variables $z_i$ and b using a variant of the Expectation Maximization algorithm with a variational approximation for the posterior distributions, which are not analytically tractable. Because it is a fully Bayesian approach, VBLS does not require any parameterization, except for the initial (prior) distributions of hidden parameters, which are set in an uninformative way, i.e., with very large variances that lead to flat distributions.

LM-Based Granular Segment/Path Characteristic Probing Technique

Figure 6:
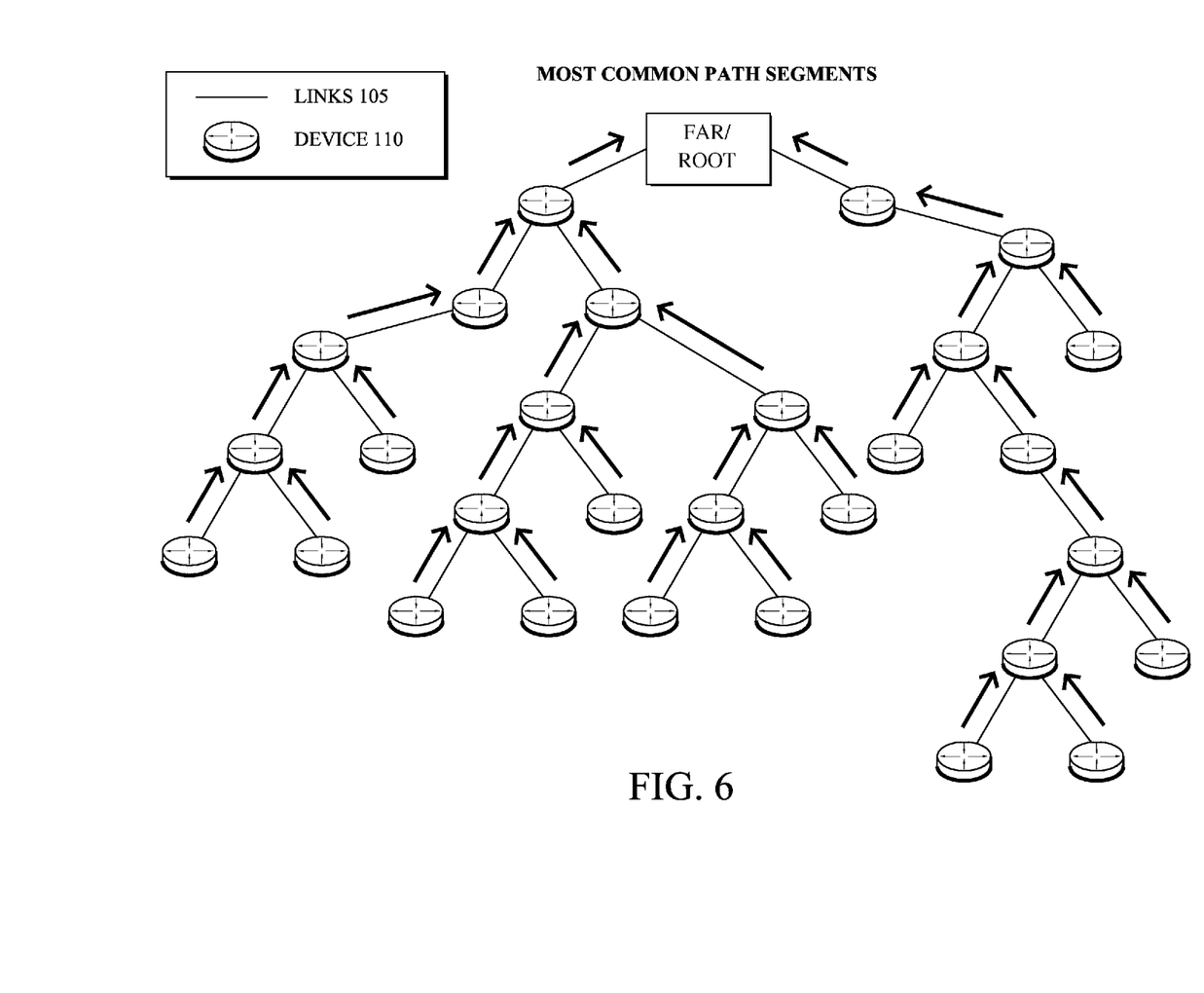
FIGS. 6-8 illustrate an example of an LM-based granular segment/path characteristic probing technique.

Sometimes, the DAG (or the routing topology in general computed by a routing protocol) would be formed such that a large percentage of traffic from the nodes will be traversed by a few common path segments of the DAG to reach the root. This is illustrated in FIG. 6. For the purposes of the present disclosure, the nodes through which a large percentage of network traffic travels may be referred to as "important nodes," as they are of relative importance based on their location in the network. This would be true in both the upstream and downstream directions. In such a situation, even though the network may have used a Learning Machine (LM) that has tuned separate sub-DAGs for optimum performance, the common path segments that will be traversed could prove to be a bottleneck. In this case, the LM would need an additional set of metrics with higher granularity to determine the path characteristics that would, in turn, allow it to optimize the behavior of the nodes for increased performance. These granular data could be specific to the environment, type of traffic, attributes of the type of sensor or a plethora of other metrics that would usually not be reported in a regular mode of operation (simply because they are not useful in the general case or because this would require too much overhead traffic in the network), but are being requested by the LM for fine grained closed-loop control specific to specific (e.g., long) paths.

Gathering such granular data from specific paths is a real challenge especially in LLNs, as individually requesting each node to generate such additional information will lead to higher control plane traffic volume that in turn might affect the metrics of interest and traffic transiting these nodes. Note that this is a subtle, but important issue: if a path segment (sometimes referred to merely as segment in the rest of this description) requires gathering additional information, then the gathering of these data may itself adversely affect the network behavior that the LM must analyze. This will be further exacerbated if the segment is long, consists of many nodes, and is far from the LM. Also, on many occasions, the FAR hosting the LM will be busy processing tasks and not able to communicate the details of all path segments of interest.

The techniques herein present a lightweight remote mechanism whereby an LM indirectly requests all the nodes in a specific path to collaboratively collect and report granular network characteristics. By contrast with existing mechanisms, the techniques herein do not rely on contacting each node individually but instead use one request and one response packet to piggyback the information in a collaborative fashion. In other words, only a single response packet is received, since the response packet may aggregate reported values from the nodes. Notably, the reported values may be aggregated in the response packet in a number of way, including, for example, aggregating all reported values, only aggregating values if different from previous values, combining the reported values, averaging the reported values, and so forth.

Said differently, the techniques herein gather specific (temporary, granular) metrics related to path segments in a network. It should be understood that the metrics encompass both metrics that characterize the network, such as QoS, as well as performance metrics derived from how the various elements (e.g., nodes) that make up the network are behaving, such as rate of change in parent-child relationships, their selection skewness, dynamics of packet retransmissions, and so forth. According to the techniques herein, a newly defined message is sent to a remote node that originates a set of metric gathering message toward (locally or remotely) computed segment; alternatively, the message may be sent to one of multiple remote nodes for an entire region, then multicast to all other remote nodes in the region, in which case a set of head-node becomes responsible for generating such remote metric collection messages. This lightweight mechanism requires the generation of only one request packet that transits all the nodes in the segment. On its return journey to the LM, only one packet gathers all the metrics from the nodes and is transmitted back to the root to be forwarded to the LM. Furthermore, mechanisms are used to filter the metric of interest (e.g., for example report metric if above a specific threshold), compress data (at the head node of the remote segment), and according to a specific schedule or period of time.

Notably, techniques for gathering performance metrics from nodes in a network have been prevalent for many years. These range from SNMP polling to periodic notifications from the nodes themselves. In LLN scenarios, metrics can be reported using CoAP/CSMP responses. Most of these techniques however suffer from the fact that they do not take into account topological limitations or limitations of the media on which they are being used. Currently, in the LLN area, there exist no mechanisms to request metrics from nodes in a segment without individually requesting them and expecting corresponding responses from all of them. Although replies may be aggregated along the path to the requester, such an approach is not always applicable. As noted, the techniques herein, however, allow determining of path segment characteristics using lightweight technique where only one request and one response packet is generated for the whole segment.

Figure 7:
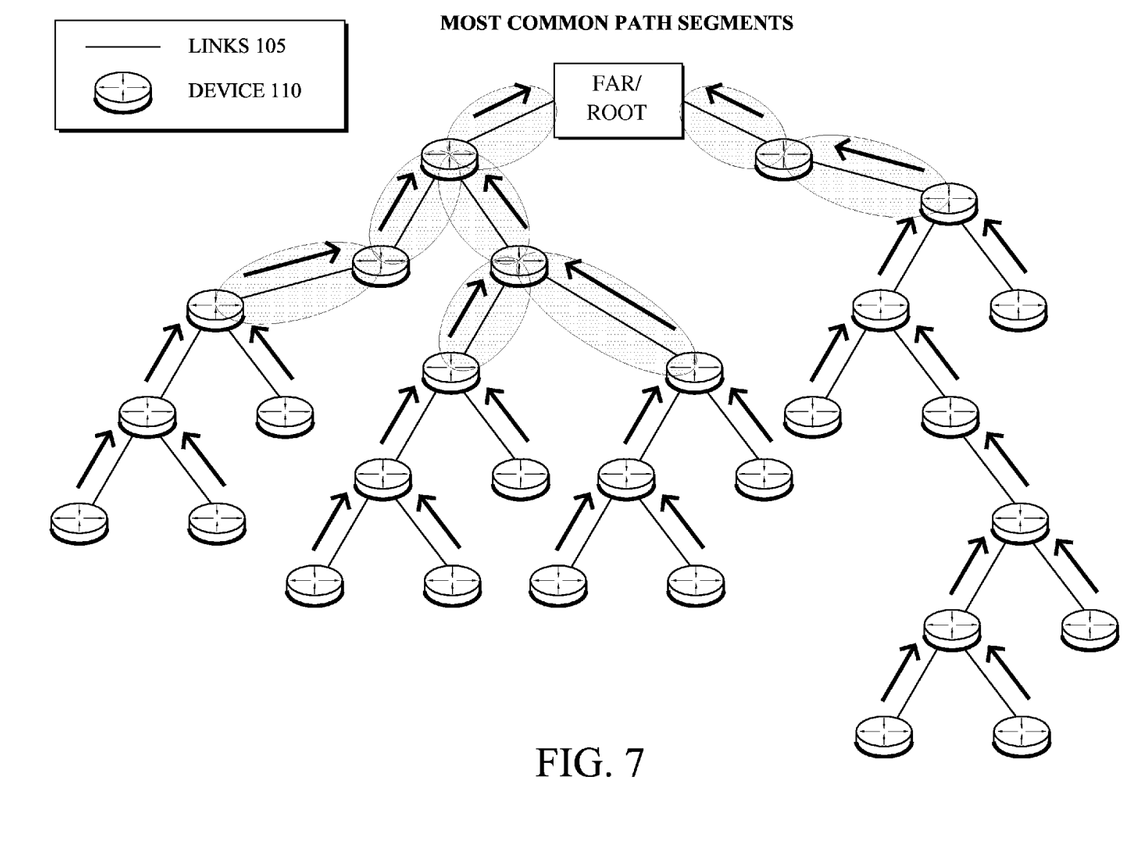
Figure 8:
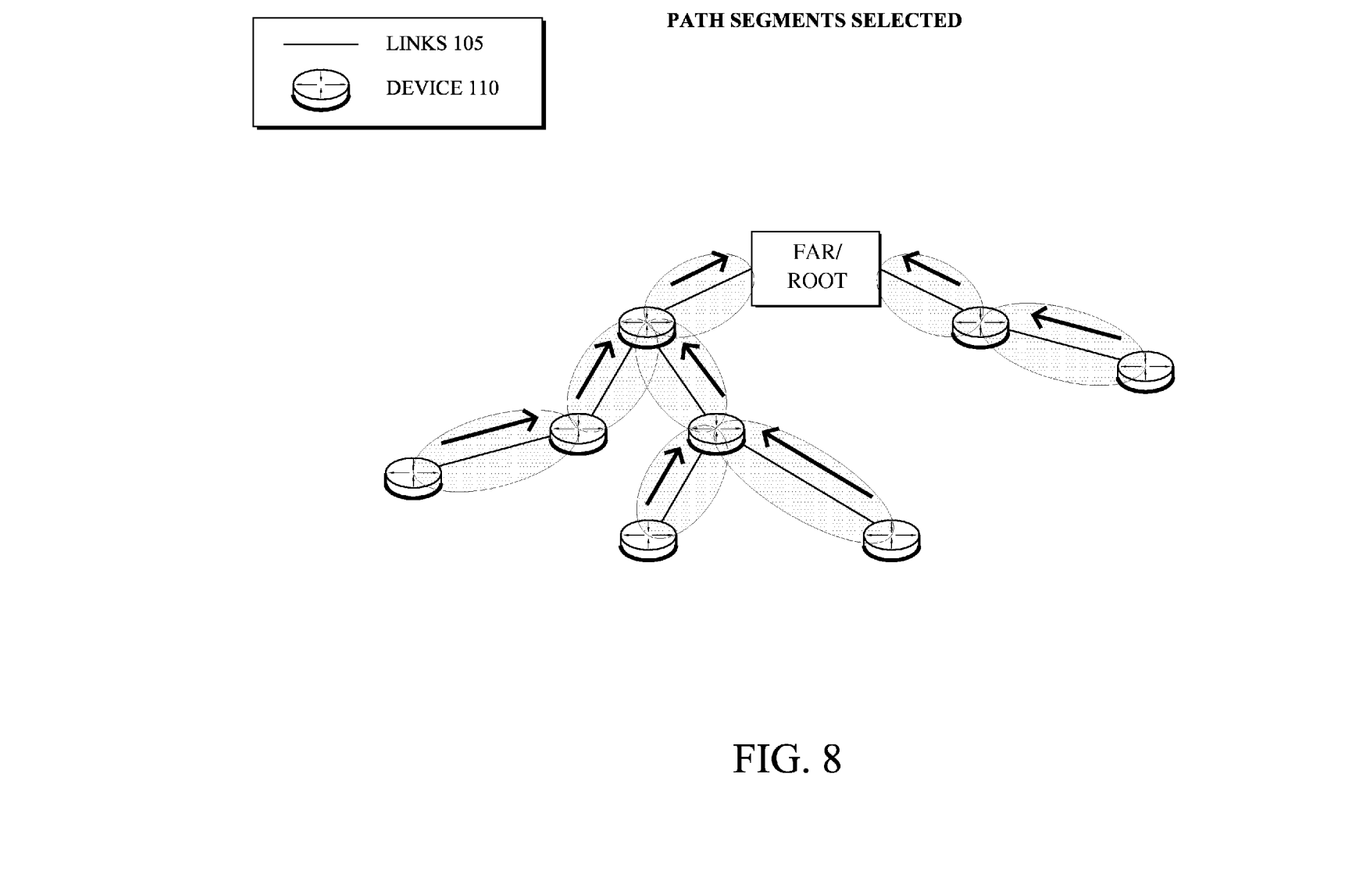

Operationally, as shown in (and with general reference to) FIGS. 6-8, the techniques herein consist of multiple components each tasked with a specific responsibility.

The first component, called the Topology Component (TC) is responsible for determining the section of the topology that needs to generate additional metrics. The LM agent on the FAR keeps track of the topology profile. Using this, it can determine sections of the topology that are common to a large number of traffic flows, or the path segment that required additional metrics for a period of time. First, a list consisting of paths from every node to the FAR is created. Then, the common nodes that appear in all the paths are determined and put in another list of nodes. From this list of common nodes, the set of nodes that form a child-parent relationship are separated out to form the common path segments. The goal is to have the longest disjoint path. If there are some nodes that are isolated, topological proximity with other isolated nodes in the same list can be used to setup a path from each of the nodes. FIGS. 7 and 8 illustrate this concept.

Once the set of segments has been determined, the LM can flag some paths as being more critical than the others. In one embodiment, path-segments can be sorted by the number of distinct paths that they serve. In another embodiment, path-segments can be sorted by the number of nodes that they serve. This is because some of them will be higher up in the tree closer to the FAR and has more potential impact with respect to being a bottleneck and having heavier transit traffic. The LM can choose to track these path-segments more closely than the others. The LM agent can choose to refresh this list of path-segments periodically be re-computing them.

In another embodiment, the LM agent can decide to pick a segment using only geographical triangulation. Instead of computing segments, the LM agent can select nodes in the physical area of concern such that they form a segment. In yet another embodiment, the LM agent can contact a node and ask it to select nodes such that segments of a certain radius are formed. In such a case, what is requested is to gather additional information related to a remote region, that is itself made of a set of nodes, and consequently segments.

The second component of the techniques herein called the Request Component (RC) is responsible for generating a granular metric report request from all the nodes in a segment. After the LM module has identified a segment of interest it creates a list of the granular metrics that it needs for further optimization.

The RC then generates a newly defined IPv6 control message called the Remote Metric Segment Collection message (RMSC) destined to a node X (see the node selection below) that comprises the following information:

1. The metric list (e.g., MAC-layer information, fine-grained metrics related to routing, etc.).
2. The list of IPv6 addresses of all nodes from which the LM requires the granular information.
3. (optional) Schedule (period of time (e.g. from 2 am to 4 am), duration, etc.).
4. (optional) a scope S.

5. The type of requests (from all paths from every node listed, a specific path).

The RC message is then sent to the node X. If the request type is for a specific segment, then X is the first node along the segment of interest. If the request relates to a set of segments between all nodes listed in the message, then any node in the list can be selected.

Upon receiving the above message, if the request is related to one segment, the first node generates an empty newly defined IPv6 Segment Metric Collection (SMC) message forwards the SMC message to the next node on the list. As all the nodes are implicitly lying on a path, every node knows the next downstream node from the list of nodes. This process continues until the packet reaches the last node on the list. In another embodiment the request could contain only a list of metrics, the segment length (Radius) and the head of the segment. This will result in the segment being determined on the head remote segment node itself. It will then generate a similar packet and forward it to the next hop, which in turn will do the same until the final node.

In the most complex form where a list of segments is of interest (Type of request is from all paths from every node listed), then a node X will receive the newly defined RMSC message, which will then be locally broadcast or multicasted with a scope S (TTL=S), where S is dynamically computed by the node X observing the list of nodes and the routing topology. Then each node that ends up being the head of a path segment will generate its own SMC message after the expiration of a random timer (to avoid collision of control plane traffic that may corrupt the metric of interest). The unicast SMC message only contains information relevant to the specific path segment identified by the segment head.

The third component of the techniques herein called the Response Component is responsible for how all the nodes contribute to the response going back to the LM. The last node of the path-segment creates a new packet, puts the same list of nodes (this time in reverse order as the packet is now traveling upward) and its own list of metric values that the LM requested and forwards the packet upstream to the next node on the list. This process keeps repeating until the packet reaches the first node on the list. At this point, the first node adds its own metric list of values to the packet and forwards it towards the root. In another embodiment, any of the nodes can employ a filtering technique where metric values that do not meet a certain threshold are removed from the packet or not reported in the first place (for example, the LM may request to report nodes for which the signal strength falls below a pre-defined value of interest). In yet another embodiment, the head of the path-segment can do a custom aggregation and use local processing to determine what useful information to send back to the LM.

Note that the list of nodes that belong to the path segment of interest may be compressed by using bloom filters in order to compress data. Furthermore, the generation of SMC messages may also be controlled according to schedule and/or period of time specified by the LM in the RMSC message.

When this packet containing all the metrics reaches the router hosting the LM, it forwards it to the LM module that now has all the required metric values that it requires.

It should be noted, that although this mechanism is presented in the context of RPL DAGs, this mechanism could be used in any wired or wireless scenario to capture metrics from nodes in a lightweight fashion by specifying the nodes that need to provide this info.

Figure 9:
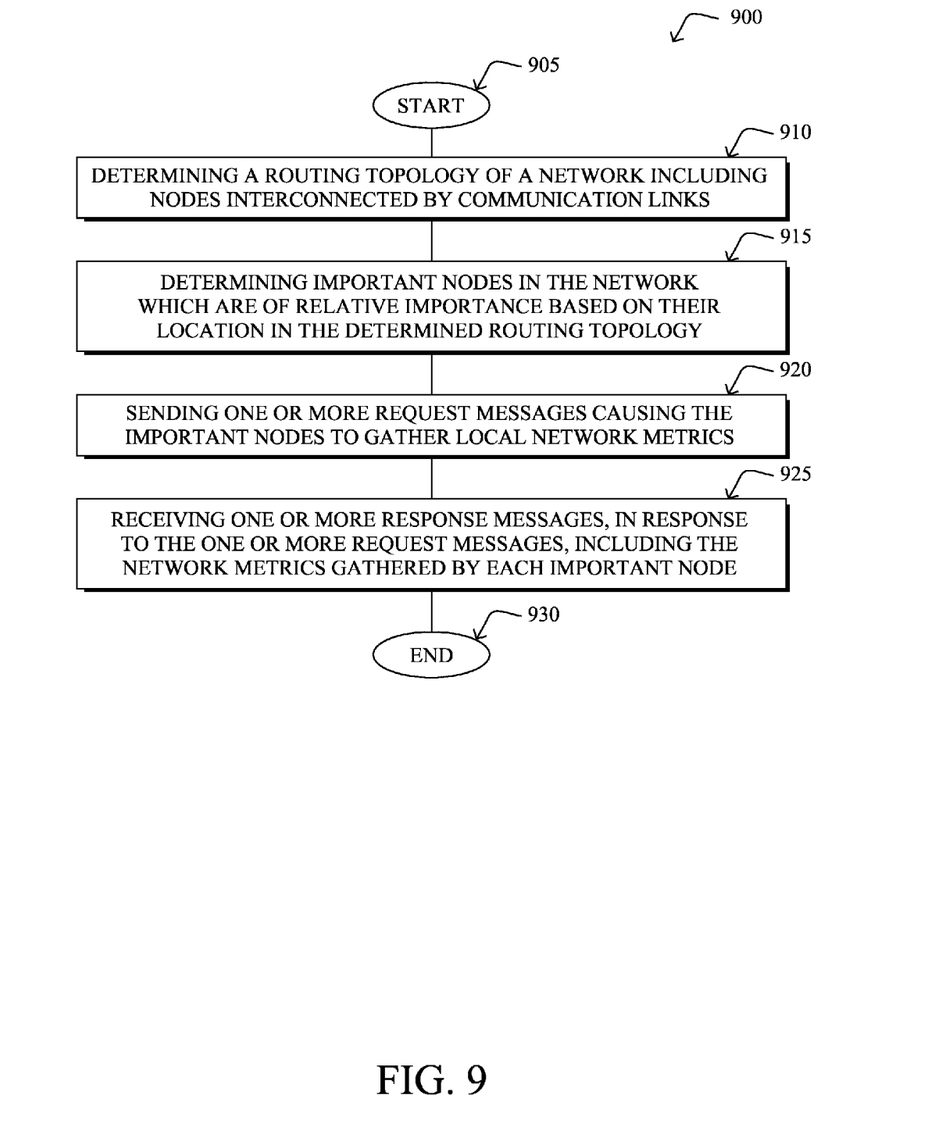
FIG. 9 illustrates an example simplified procedure for a learning machine-based granular segment/path characteristic probing technique.

FIG. 9 illustrates an example simplified procedure for a learning machine-based granular segment/path characteristic probing technique. The procedure 900 may start at step 905, continue to step 910, and so forth.

At step 910, a routing topology of a network including nodes interconnected by communication links is determined. At step 915, important nodes in the network which are of relative importance are determined based on their location in the determined routing topology. Also, at step 920, one or more request messages are sent causing the important nodes to gather local network metrics. Then, at step 925, in response to the one or more request messages, one or more response messages including the network metrics gathered by each important node are received. The procedure 900 may illustratively end at step 930. The techniques by which the steps of procedure 900 may be performed, as well as ancillary procedures and parameters, are described in detail above.

It should be noted that the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for an LM-based granular segment/path characteristic probing technique. In particular, the techniques herein:

1. provide a mechanism to determine the most commonly used path-segments in the topology thus allowing for more focused tracking of that area by the LM;

2. present a manner to request specific metrics from a set of nodes that form a path-segment without sending individual requests or generating individual responses from the nodes;

3. allow a remote trigger of probes to carry these metrics where the head of the path-segment can generate a request for the nodes of the path-segment to respond with their metric values;

4. use only one request packet to convey the metric list being requested to all the nodes in the path; and 5. use only one response packet to gather the metrics from all the nodes in the path.

Illustratively, each of the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

While there have been shown and described illustrative embodiments that provide for learning-machine-based predictive and proactive computer networking and associated monitoring, generally, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining a routing topology of a network including nodes interconnected by communication links;
    determining important nodes in the network which are of relative importance based on their location in the determined routing topology;
    designating a head node of the important nodes;
    sending one or more request messages causing the important nodes to gather local network metrics; and
    in response to the one or more request messages, receiving one or more response messages including the network metrics gathered by each important node.

2. The method as in claim 1, wherein:
    only a single request message is sent, and
    only a single response message, which aggregates reported values from the important nodes, is received.

3. The method as in claim 1, further comprising:
    sending the one or more request messages to the head node, wherein the head node is configured to forward the one or more request messages to the remaining important nodes; and
    receiving the one or more response messages from the head node.

4. The method as in claim 1, further comprising:
    sending an instruction to the head node to request the remaining important nodes to gather the local network metrics.

5. The method as in claim 1, further comprising:
    receiving the one or more response messages as compressed data, the one or more response messages being compressed by the head node.

6. The method as in claim 1, wherein the determining of the important nodes further comprises:
    determining a region of the network that experiences relatively high volumes of network traffic; and
    identifying nodes that reside within the region as the important nodes.

7. The method as in claim 1, wherein the determining of the important nodes further comprises:
    determining a communication route in the network that experiences relatively high volumes of network traffic; and
    identifying nodes that reside along the communication route as the important nodes.

8. The method as in claim 1, further comprising:
    selecting one or more network metrics to be gathered by the important nodes; and
    including an indication of the one or more selected network metrics in the one or more request messages.

9. The method as in claim 1, further comprising:
    defining a condition which, when satisfied, causes the important nodes to report the gathered network metrics; and
    including an indication of the rule in the one or more request messages.

10. The method as in claim 1, further comprising:
    defining a schedule, whereby the important nodes report the gathered network metrics according to the schedule; and
    including an indication of the schedule in the one or more request messages.

11. The method as in claim 1, wherein the routing topology is configured as a directed acyclic graph (DAG).

12. An apparatus, comprising:
    one or more network interfaces that communicate with a network;
    a processor coupled to the one or more network interfaces and configured to execute a process; and
    a memory configured to store program instructions which contain the process executable by the processor, the process comprising:
        determining a routing topology of the network including nodes interconnected by communication links;
        determining important nodes in the network which are of relative importance based on their location in the determined routing topology;
        designating a head node of the important nodes;
        sending one or more request messages causing the important nodes to gather local network metrics; and
        in response to the one or more request messages, receiving one or more response messages including the network metrics gathered by each important node.

13. The apparatus as in claim 12, wherein:
    only a single request message is sent, and
    only a single response message, which aggregates reported values from the important nodes, is received.

14. The apparatus as in claim 12, wherein the process further comprises:
    sending the one or more request messages to the head node, wherein the head node is configured to forward the one or more request messages to the remaining important nodes; and
    receiving the one or more response messages from the head node.

15. The apparatus as in claim 12, wherein the process further comprises:
    sending an instruction to the head node to request the remaining important nodes to gather the local network metrics.

16. The apparatus as in claim 12, wherein the process further comprises:
    receiving the one or more response messages as compressed data, the one or more response messages being compressed by the head node.

17. The apparatus as in claim 12, wherein the determining of the important nodes further comprises:
   determining a region of the network that experiences relatively high volumes of network traffic; and
   identifying nodes that reside within the region as the important nodes.

18. The apparatus as in claim 12, wherein the determining of the important nodes further comprises:
   determining a communication route in the network that experiences relatively high volumes of network traffic; and
   identifying nodes that reside along the communication route as the important nodes.

19. The apparatus as in claim 12, wherein the process further comprises:
   selecting one or more network metrics to be gathered by the important nodes; and
   including an indication of the one or more selected network metrics in the one or more request messages.

20. The apparatus as in claim 12, wherein the process further comprises:
   defining a condition which, when satisfied, causes the important nodes to report the gathered network metrics; and
   including an indication of the rule in the one or more request messages.

21. The apparatus as in claim 12, wherein the process further comprises:
   defining a schedule, whereby the important nodes report the gathered network metrics according to the schedule; and
   including an indication of the schedule in the one or more request messages.

22. The apparatus as in claim 12, wherein the routing topology is configured as a directed acyclic graph (DAG).

23. A tangible non-transitory computer readable medium storing program instructions that cause a computer to execute a process, the process comprising:
   determining a routing topology of a network including nodes interconnected by communication links;
   determining important nodes in the network which are of relative importance based on their location in the determined routing topology;
   designating a head node of the important nodes;
   sending one or more request messages causing the important nodes to gather local network metrics; and
   in response to the one or more request messages, receiving one or more response messages including the network metrics gathered by each important node.

* * * * *